April 15, 1924.
J. A. GREEN
CYLINDER GAUGE
Filed Sept. 15, 1921
1,490,383
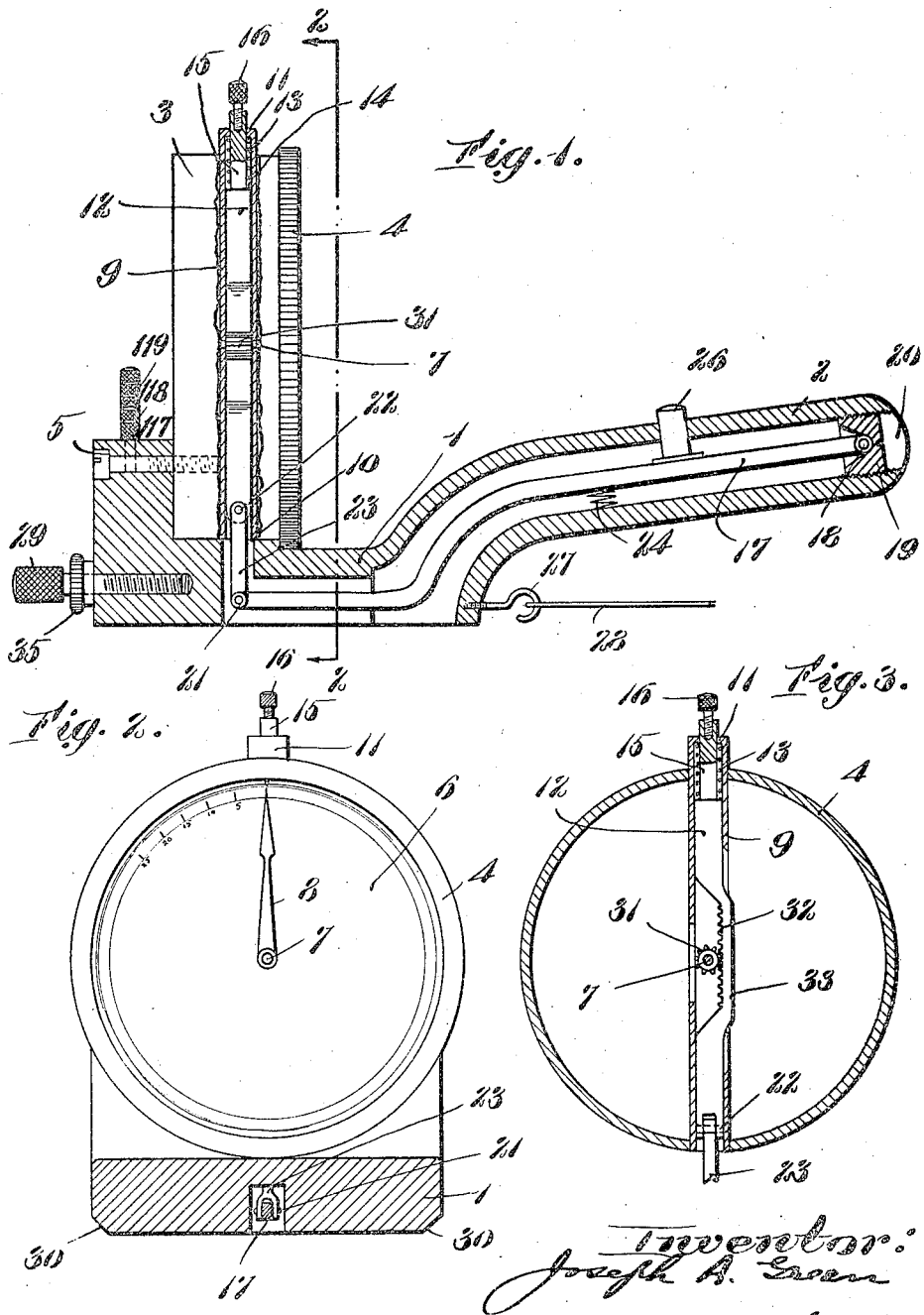

Patented Apr. 15, 1924.

1,490,383

UNITED STATES PATENT OFFICE.

JOSEPH A. GREEN, OF PROVIDENCE, RHODE ISLAND, ASSIGNOR TO FEDERAL PRODUCTS CORPORATION, OF PROVIDENCE, RHODE ISLAND, A CORPORATION OF RHODE ISLAND.

CYLINDER GAUGE.

Application filed September 15, 1921. Serial No. 500,777.

*To all whom it may concern:*

Be it known that I, JOSEPH A. GREEN, a citizen of the United States, and resident of Providence, in the county of Providence and State of Rhode Island, have invented an Improvement in Cylinder Gauges, of which the following description, in connection with the accompanying drawings, is a specification, like letters on the drawings representing like parts.

My present invention relates to gauges, and more particularly to a gauge for measuring internal diameters, such as in cylinders of automobile engines and the like, to determine the variation therein, and to enable the same to be trued up with accuracy.

Heretofore it has been difficult to measure the interior of a cylinder, such as an automobile engine cylinder, with precision, so that the mechanic could true up or machine the same with accuracy.

An important object of my present invention, therefore, is to provide a cylinder gauge which will readily, accurately, and easily determine and indicate any variation whatever from the desired diameter of the cylinder wall.

Furthermore, the gauges that are in use at the present time, so far as I am aware, can only be used with accuracy when the engine block, or other device in which a cylinder is to be tested, is horizontal. In other words, when a cylinder was in vertical position, it has been practically impossible to determine whether or not the cylinder was in desired true form.

Therefore, a further and important object of my invention is to provide a gauge which will permit of use whether the cylinder is in horizontal or vertical position, and which also permits of easy reading of the indicator dial for all variations, if any.

By my present construction I have provided means which will facilitate the application to and withdrawal from, of my gauge during the measuring operation, particularly where the article to be measured has a contracted or narrow throat or opening, such as a flange or rim therearound, and to this end I provide means by which may be depressed one or more of the contacting members within the limits of the diameter of the article to which the gauge is applied, and when the gauge is positioned, to allow the release of the contacting member and thereby automatically complete the measuring and indicating operation. This feature of an automatic release after the gauge is within the article to be measured, is broadly new, so far as I am advised.

My present invention comprises a gauge having an indicator dial and a needle or pointer to indicate zero and any variation therefrom, which dial and indicator will give an accurate visual reading of the amount or degree of variation, if any. This pointer is operated by means of a movable rod, one end of which comes in contact with the cylinder walls, and operates, by means of a positive geared connection, the pointer which indicates on the graduated dial the degree of variation.

Further objects of the invention, novel combinations of parts and advantages will be hereinafter more fully pointed out and claimed.

Referring to the drawings, illustrating a preferred embodiment of my invention,

Fig. 1 is a longitudinal sectional view of my novel gauge;

Fig. 2 is a view on the line 2—2 of Fig. 1; and

Fig. 3 is a sectional view showing the manner of operating the pointer on the dial.

Referring to the drawings, 1 indicates the base of my improved gauge, and has formed thereon, preferably as an integral part thereof, the handle 2, this handle being curved outwardly and upwardly from the base to provide an easy handhold for the operator, and in a balanced relation to the center of gravity of the entire device. Attached to the base 1 in any desired manner, here shown as by a screw 5, is the portion 3, which contains the main movable parts of my device. To the front portion of the portion 3 is attached a rim or bezel 4, to hold in place the glass covering of the indicator 6. This indicator 6 is graduated in divisions that correspond to the length indication of the movement of the plunger, as clearly indicated. Secured to a pin 7 is a pointer or hand 8, the operation of which will be later described, and this pointer normally indicates zero.

Fitting within the casing 3 is a tubular member 9, resting on the base 1 as shown at 10, and having an inwardly extending flange or shoulder 11 that acts as a bearing. Slidably fitted in the tube 9 is a rod 12, its upper end being narrowed, as shown at 15, to slide through the opening formed by the flange or shoulder 11, this flange or shoulder 11 also receiving one end of a coiled spring 13, which abuts against the inner part of the flange or shoulder 11 and the upper face of a shoulder 14 on the rod 12. This spring 13 normally tends to force the rod downwardly. The smaller portion 15 of the rod 12 is threaded to receive a correspondingly threaded knurled member 16, which member forms one contacting point on the interior of the cylinder to be tested or measured. At the rear of the base 1 are several threaded holes to receive and carry a plurality of different length members 117, 118, 119, etc., to take the place of the member 16, when a longer or shorter member is desired.

The handle portion 2 is hollow, and has therein a curved rod or lever 17, pivoted at 18 to the block 19 which is threaded in the outer end of the handle 2, the block 19 being covered by a rounded plug 20 which is also threaded in the outermost end of the handle 2. The block 19 is screwed into the handle portion and to a hole drilled through the handle and the block 19 for the reception of the pivot 18, the rod lever 17 being inserted from the end of the handle adjacent of the member 1. Pivotally connected at 21 on the rod 17 and at 22 on the rod 12, is a connecting link 23, permitting vertical movement of the rod 12. Between the connecting point 21 and the pivot point 18 on the rod 17 is secured a coiled spring 24, normally tending to force the rod 17 in an upward direction. The two springs, 13 and 24, therefore, both exerting an equal tension in opposite directions, will normally keep the rod 9 in equilibrium, with the result that the indicator or pointer 8, is very sensitive. Any variation in the surface being measured, or tested, would therefore cause a movement of the rod 9 up or down, and indicate the degree of variation therein.

It is difficult at times to insert the gauge in a cylinder, to commence the test of measuring, because the diameter of the gauge from the bottom of the base to the top of the member 16, may be too great to permit of its normal insertion therein, and to obviate this difficulty I have provided on the rod 17 a button 26, which extends upwardly through the aperture in the handle 2, and is in easy view and reach of the operator. Pressure of the thumb or finger of the operator on this button 26, therefore, will cause the rod 12 and consequently the member 16 to move downwardly, and thus permit of its ready insertion into any article, particularly where the article has a contracted opening. This feature is of special novelty and of importance.

For the purpose of lowering the gauge into the cylinder, when the cylinder is deeper than can be conveniently handled by holding the handle 2 in the hand, I attach to the base 1, under the handle 2, an eye 27, to which may be attached, a wire, cord, or other means for lowering and raising the gauge in the cylinder.

At the extreme rearmost portion of the base 1 is a recess in which a projecting extension 29 may be screwed or otherwise secured, to extend beyond the base any desired distance to prevent the gauge from being caught and jammed in the combustion chamber of an automobile engine cylinder or the like when the device is used in cylinders having integral heads. This can be changed for a longer or shorter extending piece, as desired. This extension 29 is held in place and locked by a locking member 35.

As shown in Fig. 2, the bottom edges of the base 1 are beveled, as indicated at 30, 30, to permit a close sliding fit against the walls of the cylinder to be measured or tested the width of the bevels being so narrow that they contact with the walls of the cylinders at but substantially a single point. It will thus be seen that I have provided a three-point engagement or contact of my gauge with the interior of the cylinder, i. e., the two bevels 30 and the top of the member 16. This permits of great accuracy in the operation of my device, and the slightest discrepancy or variation in the surface to be measured will be at once apparent and indicated on the graduated dial.

In order to insure cooperation between the rod 12 and the indicator needle or pointer 8, the pin 7 has keyed on its rearmost end a small pinion 31, which is in constant mesh with the rack 32 of the rod 12, which rack is formed at 33 to permit of such mesh. It will thus be seen that any movement, upwardly or downward, of the rod 12 by reason of any variation in the diameter of the cylinder will cause the pin 7 and pointer 8 to operate, thus indicating the degree or amount of variation or change in the surface being measured or tested.

While I have described my present invention somewhat in detail, it will be appreciated that I am not limited thereto, but may vary the size, shape and arrangement of parts within wide limits, without departing from the spirit of the invention. Also I may utilize any type or kind of indicator desired and have utilized the construction of indicator shown in the drawings for illustrative purposes only.

My invention is further described and defined in the form of claims as follows:

1. A gauge adapted to contact at three points with the interior diameter of an article to be measured, one of said contacting points being controlled in its radial movement at a point remote from the points of contact, said controlling means comprising a lever, a link connection from said lever to the contact member to be moved, a handle for the gauge secured thereto and extending therefrom and means on the handle to operate said lever.

2. An improved indicating device of the kind described, comprising a base, a handle rigidly attached thereto, a casing on said base having thereon a graduated dial, a rotatably mounted hand associated therewith, a tube in said casing, a movable rod in said tube, means connecting said rod and hand to actuate the hand, yielding means to maintain said rod in position such that the hand will normally indicate zero, and means connected to said rod and adapted to move the same to permit of insertion of the device into a cylinder or other instrument to be measured, with its contacting portion out of contact with the article to be measured.

3. An indicating device of the kind described, comprising a base, a casing and dial thereon, a hand on said dial and means to actuate the same, a handle attached to said base, means secured to the handle to permit insertion of the device into a cylinder or instrument to be measured, and means, detachably secured to and having its end adjustable toward and from said base to predetermine the distance within the cylinder to which the device may be placed.

In testimony whereof, I have signed my name to this specification.

JOSEPH A. GREEN.